(12) United States Patent
Chaudhry et al.

(10) Patent No.: US 10,788,134 B2
(45) Date of Patent: Sep. 29, 2020

(54) HIGH FLOW SPOOL VALVE

(71) Applicant: AUTOMATIC SWITCH COMPANY, Florham Park, NJ (US)

(72) Inventors: Ahmad Abbas Chaudhry, Hillsborough, NJ (US); Narasimharajpur Devappa Harsha, Maharashtra (IN); Gregory James Volz, Pequannock, NJ (US)

(73) Assignee: AUTOMATIC SWITCH COMPANY, Florham Park, NJ (US)

( * ) Notice: Subject to any disclaimer, the term of this patent is extended or adjusted under 35 U.S.C. 154(b) by 0 days.

(21) Appl. No.: 15/323,097

(22) PCT Filed: Nov. 23, 2015

(86) PCT No.: PCT/US2015/062210
§ 371 (c)(1),
(2) Date: Dec. 29, 2016

(87) PCT Pub. No.: WO2017/039731
PCT Pub. Date: Mar. 9, 2017

(65) Prior Publication Data
US 2017/0198821 A1    Jul. 13, 2017

(30) Foreign Application Priority Data
Aug. 31, 2015  (IN) .......................... 3337/MUM/2015

(51) Int. Cl.
*F16K 11/07*        (2006.01)
*F16K 25/02*        (2006.01)

(52) U.S. Cl.
CPC ...... *F16K 11/0712* (2013.01); *F16K 11/0708* (2013.01); *F16K 25/02* (2013.01); *Y10T 137/8671* (2015.04)

(58) Field of Classification Search
CPC ...... F16K 11/0712; F16K 25/02; F16K 11/07; F16K 27/014; Y10T 137/8671;
(Continued)

(56) References Cited

U.S. PATENT DOCUMENTS 3,460,577 A    8/1969  Weathers
3,735,780 A *  5/1973  Heid ...................... F16K 11/07
                                                            137/625.69
(Continued)

FOREIGN PATENT DOCUMENTS

DE    102009040288 A1    3/2011
EP        0120022 B1    10/1984
(Continued)

OTHER PUBLICATIONS

PCT Search Report for PCT Application No. PCT/US15/62210 dated Jun. 7, 2016.
(Continued)

*Primary Examiner* — Kelsey E Cary
(74) *Attorney, Agent, or Firm* — Mackey Law Firm PLLC

(57) ABSTRACT

The present disclosure provides a high flow coefficient spool valve (50) through one or more changes in the flow path from a conventional spool valve. The body (56) of the spool valve includes spherically contoured internal grooves (68). The spool (58), slidably engaged inside the body (56), includes concave surfaces between seals (62) that is complementary to the spherically shaped internal grooves (68) of the body. The spherical shape of the body internal grooves (68) and/or concave shape of the spool allow more volume and more laminar flow therebetween, resulting in an increased flow coefficient and flow capacity. The body also is formed with transverse port windows in the port that contour into a bore of the body adjacent the spool. A choke
(Continued)

volume in the flow is strategically designed in a parallel flow location rather than a perpendicular flow location to promote laminar flow and lessen turbulence to also increase the flow coefficient.

19 Claims, 14 Drawing Sheets

(58) Field of Classification Search
CPC ....... Y10T 137/86622; Y10T 137/8667; Y10T 137/86694
USPC ............. 137/625.69, 625.65, 625.25, 625.67
See application file for complete search history.

(56) References Cited

U.S. PATENT DOCUMENTS

| | | | |
|---|---|---|---|
| 3,812,883 A | 5/1974 | Yokokawa | |
| 5,609,343 A | 3/1997 | Asou et al. | |
| 6,666,225 B2* | 12/2003 | Kemmner | F16H 57/04 137/14 |
| 8,800,399 B2 | 8/2014 | Mills | |
| 2003/0221731 A1 | 12/2003 | Ogura et al. | |
| 2008/0041469 A1* | 2/2008 | Dantlgraber | F16K 11/07 137/625.34 |
| 2010/0096033 A1* | 4/2010 | Yoshimura | F16K 11/0712 137/625.69 |
| 2014/0116551 A1* | 5/2014 | Smith | F16K 11/0716 137/625.69 |

FOREIGN PATENT DOCUMENTS

| | | |
|---|---|---|
| EP | 0120022 B1 | 7/1988 |
| WO | 8303882 A1 | 11/1983 |

OTHER PUBLICATIONS

PCT Written Opinion for PCT Application No. PCT/US15/62210 dated Jun. 7, 2016.
Decision to grant a European patent dated Aug. 30, 2018 for EP Application No. 15808305.5.
Intention to grant a European patent dated Jan. 1, 2018 for EP Application No. 15808305.5.
Transmission of the certificate for a European patent dated Oct. 8, 2018 for EP Application No. 15808305.5.
Indian Examination Report dated Jan. 7, 2019 for IN Application No. 3337/MUM/2015.
Extended European Search Report dated Aug. 20, 2018 for EP Application No. 18183146.2.
First Office Action dated Jul. 31, 2018 for CN Application No. 2015800466150.
Communication pursuant to Article 94(3) EPC dated Aug. 16, 2019 for EP Application No. 18183146.2.
First Office Action dated Sep. 17, 2019 for JP Application No. 2017-511873.

\* cited by examiner

|  | V1(mm³) | V2(mm³) | V3(mm³) | V4(mm³) | V5(mm³) | V6(mm³) |
|---|---|---|---|---|---|---|
| Existing Design | 1063 | 332 | 542 | 255 | 125 | 97 |
| Exemplary Design | 1420 | 280 | 836 | 322 | 317 | 137 |
| Volume Section Pic. for Ref. (Exemplary Design) | | | | | | |

FIG. 9C

HIGH FLOW SPOOL VALVE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to valves. Specifically, the disclosure relates to spool valves.

Description of the Related Art

The challenge in valve design is efficient, controlled flow. A high flow coefficient "Cv" is especially challenging for multiport spool valves that switch between multiple ports for directing flow, based on positions of the spool within a valve body. The various flow passages in a spool valve inherently create flow restrictions and lessen efficient performance. The flow efficiency can be increased by simply increasing a body size around the internal spool to allow larger internal passages, and such practices are the traditional mode of improvement. However, some applications are not conducive to an overall increase in the envelope size, so increasing the flow efficiency independently of increasing the body size has historically been challenging. Small improvements in the flow coefficient can be commercially valuable on the sizing of control components and tubing for the valved system.

FIG. 1A is a cross-sectional schematic view of a typical, existing, commercially-available solenoid-operated spool valve. FIG. 1B is a schematic partial side view of a typical spool slidably engaged in a bore of the spool valve. FIG. 1C is a schematic illustration of a typical flow path in the spool valve of FIG. 1A with at least one choke zone in the flow path. A valve 2 includes a body 4 that surrounds a spool 6 slidably disposed therein. An operator endcap 8 is coupled with the body 4 and can seal one end of the valve body. The operator endcap 8 can be coupled with a solenoid not shown to push a piston 14 coupled to the spool into different longitudinal positions. A return endcap 10 is coupled with the body 4 and can seal off the distal end of the valve body. A spring 12 biases the spool toward the operator endcap 8 to return the spool to a rest position when the solenoid is not actuated. The valve 2 has multiple ports 16A-16E with one being an inlet and others being selective outlets depending on the position of the spool relative to the valve body. The particular port that is used as an inlet can vary depending on whether the valve is operated in a normally closed as shown or normally open condition. Seals 26 slidably engage the bore 18 of the body 4 to selective close or open seal flow zones 28 of the spool relative to the ports. For example, seals 26A and 26B can seal the bore 18 in the flow zone 28A, so that the port 16C is closed from flowing into the adjacent port 16B. Similarly, seals 26B and 26C can seal to the bore 18 and control the flow in the flow zone 28B, and so forth with seals 26D and 26E for flow zone 28C and seals 26E and 26F for flow zone 28D. An internal groove 20 can be formed in the bore of the body to assist in flow in the various flow zones. The internal groove 20 is formed circumferentially as a cylinder with a straight wall and can have one or more steps 22A and 22B, being a circumferential cylinder.

The spool 6 includes a seal groove 30, such as a seal groove 30A for the seal 26A of FIG. 1A and a seal groove 30B for the seal 26B of FIG. 1A. The seal groove 30 is formed between two grooves walls 32 and 34. The groove walls can be formed with a taper surface 36 intersecting a flat cylindrical portion 24 at a smaller diameter spool barrel 38. A spool flow profile 40 is formed between the seals 26 shown in FIG. 1A, that includes two groove walls, their respective tapered surfaces and the spool barrel therebetween. For example, the spool flow profile 40A is formed between the seals 26A and 26B shown in FIG. 1A, that includes the groove wall 34A and the groove wall 34B with their respective taper surfaces 36A and 36B and the spool barrel 38A therebetween.

Referring to FIG. 1C, the valve flow zone with the least volume generally will form the most limiting flow zone for the valve. The size of the port 16 is constrained to the size of the tubing fitting to be coupled with the port. A valve flow zone 42A is formed at the base of the port 16B with the bore walls that are generally used to provide a surface against which the seals 26 can engage at different positions of the valve actuation. A second zone 42B is along the spool flow profile 40, shown in FIG. 1B. A third zone 42C is along the bore 18 and the taper surface 36, shown in FIG. 1B, as the flow enters the internal groove 20. A fourth zone 42D is in the internal groove 20. A fifth zone 42E is the outlet of the flow over the bore walls prior to the port 16E similar to the first zone 42A. With the exemplary prior valve's grooves walls, taper surfaces, spool barrel, and recesses, test on a commercially available ¼ inch NPT, commercially available model shows the Cv at about 1.59.

There remains a need for an improved flow through a valve such as a spool valve with a high Cv that can be accomplished for increased efficiency without necessitating a larger valve body.

BRIEF SUMMARY OF THE INVENTION

The present disclosure provides a high flow coefficient spool valve through one or more changes in the flow path from a conventional spool valve. The body of the spool valve includes spherically contoured internal grooves. The spool barrel, slidably engaged inside the body, includes concave surfaces between seals that is complementary to the spherically shaped internal grooves of the body. The spherical shape of the body internal grooves and/or concave shape of the spool allow more volume and more laminar flow therebetween, resulting in an increased flow coefficient and flow capacity. The body also is formed with transverse port windows in the port that contour into a bore of the body adjacent the spool. An internal choke volume in the flow is strategically designed in a parallel flow location rather than a perpendicular flow location to promote laminar flow and lessen turbulence. The flow coefficient of the improved spool valve compared to a commercially available spool valve is about a 26% increase.

The disclosure provides a spool valve comprising: a body having a bore with a plurality of internal grooves in a flow path that are spherically shaped radially outward from a longitudinal centerline of the bore and disposed longitudinally along the bore; a spool slidably engaged in the bore and having a plurality of seal grooves to engage the bore and a concave surface between the seal grooves that are shaped radially inwardly from a longitudinal centerline of the spool; and a plurality of ports formed in the body and having transverse port windows that are transverse to the body longitudinal centerline of the body and formed in the port that continue into the bore.

The disclosure also provides a spool valve comprising: a body having a bore with a plurality of internal grooves in flow zones that are outward from a longitudinal centerline of the body; a spool slidably engaged in the bore and having a plurality of seal grooves to engage the bore; and a plurality of ports formed in the body and having transverse port windows that are transverse to the body longitudinal centerline of the body and formed in the port that continue into the bore.

The disclosure further provides a spool valve comprising: a body having a bore with a plurality of internal grooves in flow zones that are spherically shaped radially outward from a longitudinal centerline of the body; a spool slidably engaged in the bore and having a plurality of seal grooves to engage the bore and a concave surface between the seal grooves that are shaped radially inwardly from a longitudinal centerline of the spool; and a choke volume disposed in a flow path through the valve, the choke volume having a flow that is in a longitudinal direction along the spool before a turn in the flow path to a transverse flow.

BRIEF DESCRIPTION OF THE SEVERAL VIEWS OF THE DRAWINGS

FIG. 9C is a chart of comparative values of the flow volumes of the valves of FIGS. 9A and 9B.

DETAILED DESCRIPTION

Figure 1A:
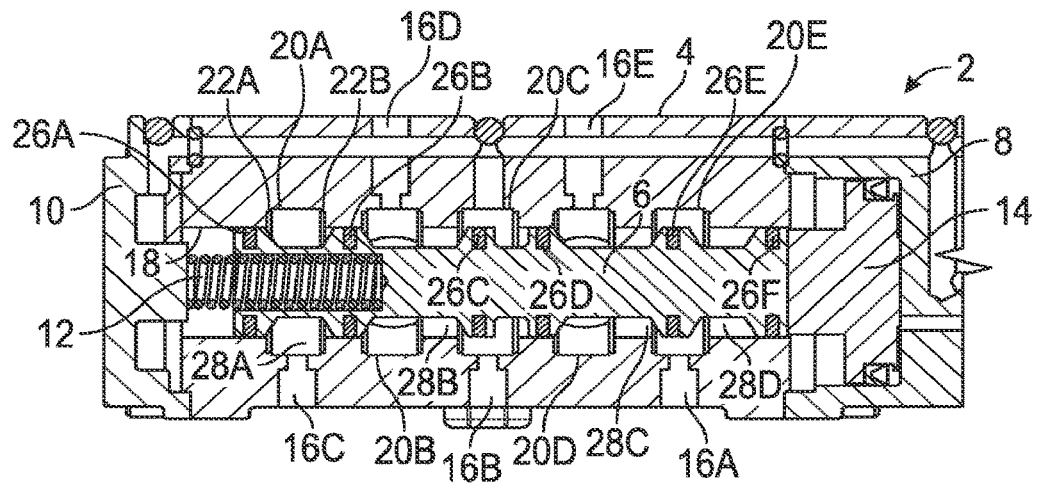
FIG. 1A is a cross-sectional schematic view of a typical commercially available spool valve.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. Where appropriate, one or more elements may have been labeled with an "A" or "B" to designate various members of a given class of an element. When referring generally to such elements, the number without the letter can be used. Further, such designations do not limit the number of members that can be used for that function. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally.

The present disclosure provides a high flow coefficient spool valve through one or more changes in the flow path from a conventional spool valve. The body of the spool valve includes spherically contoured internal grooves. The spool barrel, slidably engaged inside the body, includes concave surfaces between seals that is complementary to the spherically shaped internal grooves of the body. The spherical shape of the body internal grooves and/or concave shape of the spool allow more volume and more laminar flow therebetween, resulting in an increased flow coefficient and flow capacity. The body also is formed with transverse port windows in the port that contour into a bore of the body adjacent the spool. A choke volume in the flow is strategically designed in a parallel flow location rather than a perpendicular flow location to promote laminar flow and lessen turbulence.

Figure 2:
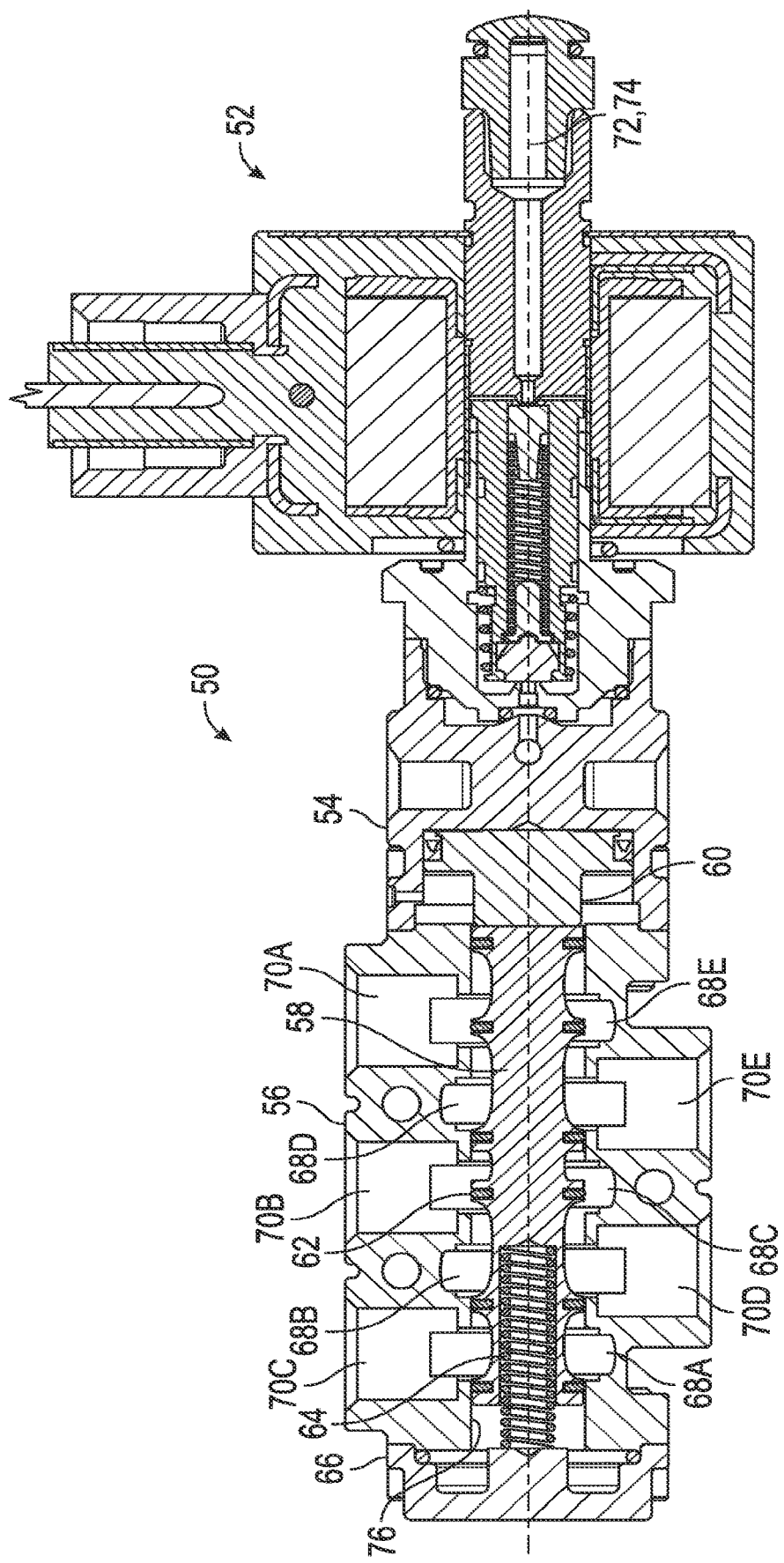
FIG. 2 is a cross-sectional schematic view of an exemplary embodiment of a spool valve, according to the invention.

FIG. 2 is a cross-sectional schematic view of an exemplary embodiment of a spool valve, according to the invention. A spool valve 50 can be coupled to an actuator 52, such as a solenoid, mechanical actuator such as a Palm™ push-pull actuator, or a hydraulic or pneumatic actuator for actuation thereof. The valve 50 is shown in a rest position without activation by the actuator 52. A solenoid can be electrical, hydraulic, pneumatic or other forms known to those with skill in the art. The valve 50 includes a body 56 having an internal bore 76. A slidably-engaged spool 58 is disposed within the bore 76. A spool centerline 74 is longitudinally aligned with the bore centerline 72; however, other configurations are possible. The spool 58 is moved longitudinally along the bore centerline 72 by a piston 60 actuated by the actuator 52. A plurality of seals 62 are disposed circumferentially around the spool 58 and seal at various locations in the bore 76 of the body 56, depending on the longitudinal position of the spool. A spring 64 or other bias member can return the spool to a rest position when the actuator 52 is not actuated. An endcap 66 houses the spring, spool, and seals around the spool and provides access for assembly and maintenance.

Various ports are formed in the body 56. FIG. 2 illustrates an exemplary four-way spool valve with ports 70A, 70B, 70C, 70D and 70E, and other greater or lesser numbers of ports are frequently used. One of the ports can function as an inlet port. Other ports can function as output ports, where flow through a particular outlet port depends on the longitudinal position of the spool 58. A typical inlet port is a central port, such as port 70B, depending upon whether or not the valve is a normally-closed valve or a normally-open valve in actuation.

Figure 3A:
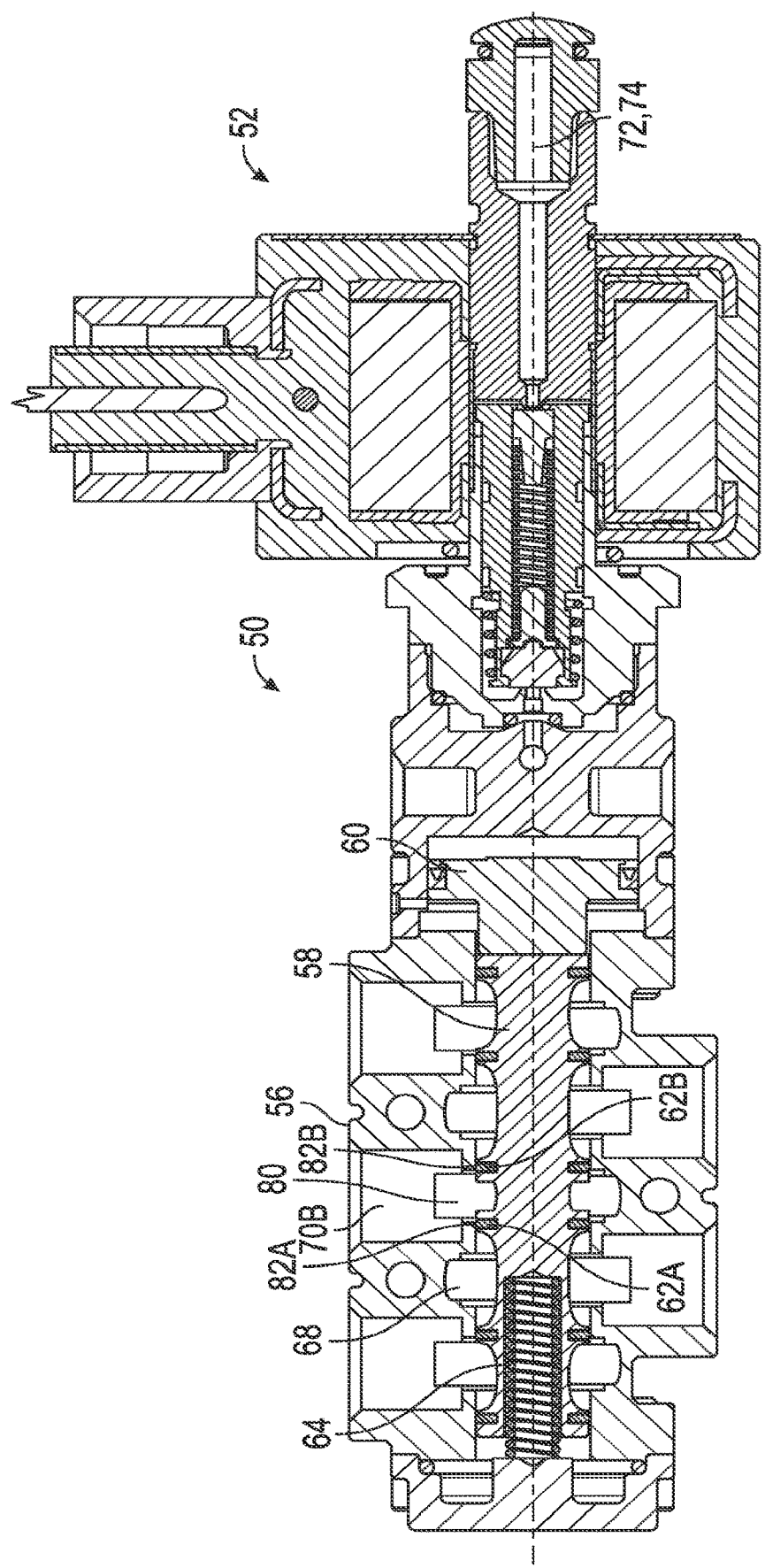
FIG. 3A is a cross-sectional schematic view of the exemplary spool valve of FIG. 2 in a center lock position.
Figure 3B:
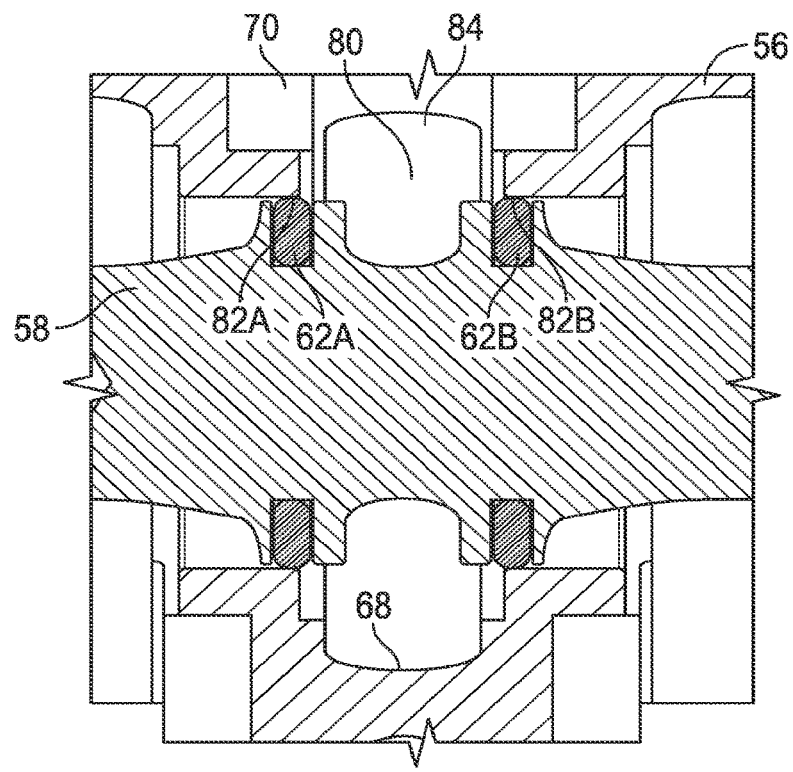
FIG. 3B is a cross-sectional schematic detail view of a portion of the exemplary spool valve of FIG. 3A illustrating seals in sealing engagement with a bore of the valve body.

FIG. 3A is a cross-sectional schematic view of the exemplary spool valve of FIG. 2 in a center lock position. FIG. 3B is a cross-sectional schematic detail view of a portion of the exemplary spool valve of FIG. 3A, illustrating seals in sealing engagement with a bore of the valve body. The valve 50 is in a "center lock position" when the seals 62A and 62B are sealingly engaged with the edges in 82A and 82B of the opening 80 at an exemplary inlet port 70B and other corresponding seals engage other corresponding ports so that flow from any of the ports is blocked. The actuator 52 has moved the piston 60 to the left in the diagram compared to FIG. 2, forcing the spool 58 to the left and compressing the spring 64. The size of the opening 80 in the longitudinal direction of the bore is maximized for flow, and so provides minimum contact between the edges 82A, 82B to the seals 62A, 62B.

The opening 80 is limited in size between the edges 82A, 82B due to the need for longitudinal contact with the seals 62A, 62B and is typically a circular cross-section to comply with the port 70 circular cross-section for threading tubing fittings. However, in the present invention, the opening 80 can be expanded transversely (that is, non-circularly) relative to the longitudinal centerline 72 to provide additional cross-sectional flow capacity through that portion of the valve. One or more transverse port windows 84 can be cut or otherwise formed into the transverse walls of a port 70 and continue into the bore 58 of the valve body 56. By providing transverse port windows 84, the flow area through the port 70 and through the opening 80 can be increased.

A further increase in flow volume and therefore flow capacity can be accomplished by reshaping the internal grooves of the valve body 56. The internal groove 68 of the body 56 can be formed with a spherical shape 90, shown as a radius in a given cross-section. The term "spherical" is used broadly to include a curved surface or stepped surfaces with incrementally angled faces that collectively may resemble a partial spherical surface in a three-dimensional view. This spherical shape 90 is in contrast to the typical cylindrical shape, shown as a straight line in a given cross-section. The shape accomplishes two advantages. First, the spherical shape 90 provides a smooth flow path for a transitory turn in the flow for the incoming flow between the spool and the valve body and the outgoing flow from the internal groove to the next flow zone. Less turbulence increases laminar flow and higher flow capacity. Second, the spherical shape 90 increases the flow capacity through that portion of the valve without changing the size of the body of the sealing surfaces of the seals.

Figure 4A:
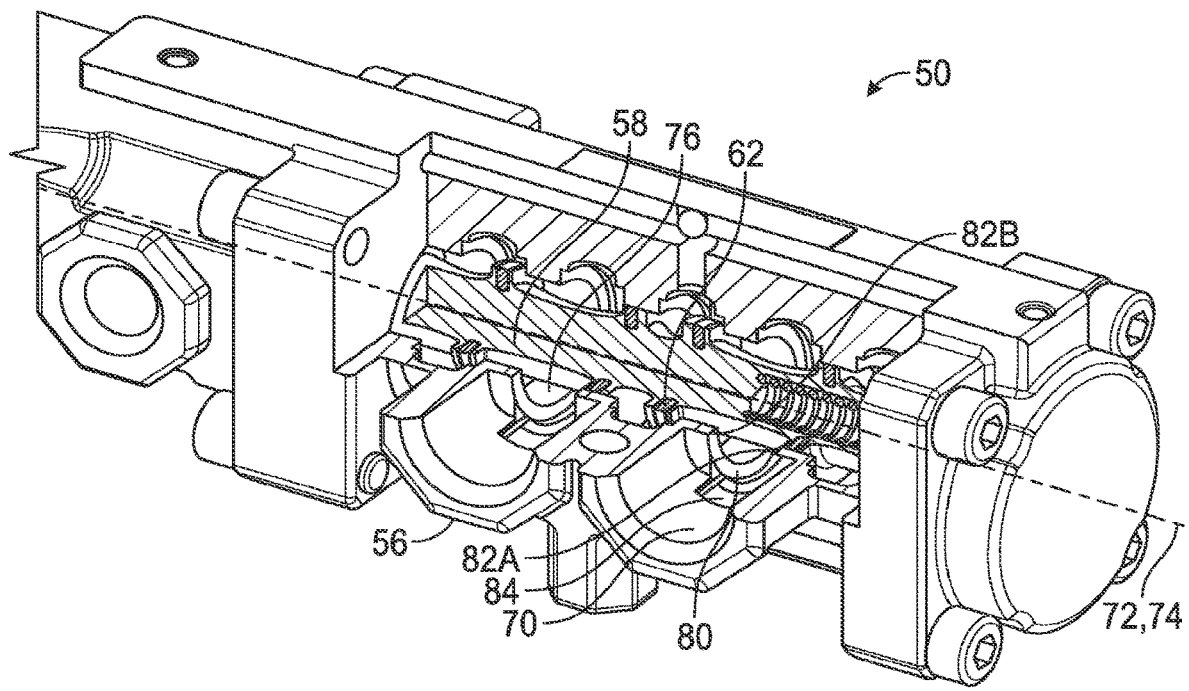
FIG. 4A is a one-quarter cut cross-sectional schematic view of the exemplary valve illustrating transverse port windows.
Figure 4B:
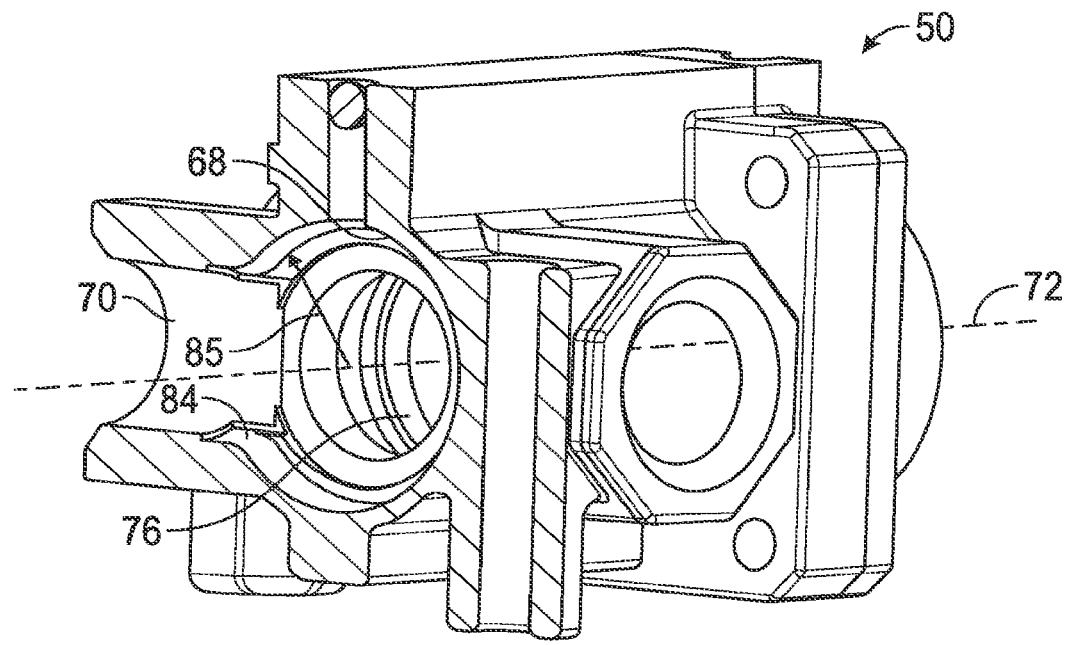
FIG. 4B is a cross-sectional transverse schematic view of the exemplary valve illustrating a transverse port window.

FIG. 4A is a one-quarter cut cross-sectional schematic view of the exemplary valve illustrating transverse port windows. FIG. 4B is a cross-sectional transverse schematic view of the exemplary valve illustrating a transverse port window. The perspective views in FIGS. 4A and 4B provide additional details of the transverse port window 84 formed transversely to the longitudinal centerline 72 of the bore 76. Flow through the port 70 is constrained by the size of the opening 80. In turn, the size of the opening 80 is constrained by the distance between the seals 62, as described in FIGS. 3A and 3B. One aspect of the invention is to provide additional flow capacity by not expanding the size of the opening 80 longitudinally but rather expanding it in an unusual way, that is, transversely. The transverse port windows 84 are cut or otherwise formed into the transverse side walls of the opening 80 and can extend into the side wall of the port 70 and into the bore 76. A window radius 85 can transition between the port 70 and the internal groove 68 for the transverse port window 84. The window radius 85 can be at least 25% of the port radius (that is about 12% of the port diameter) and advantageously at least 50% of the port radius. For example, with a typical ¼" port 70 having a mean port diameter of about 10 mm with a port radius of 5 mm, the window radius 85 at 50% would be about 2.5 mm. Thus, the edges 82A and 82B can remain constant in longitudinal spacing to seal against the seals 62 described above in FIG. 3A. Yet, the transverse port windows 84 allow an increased flow volume to pass therethrough due to an expanded cross section size in the transverse direction relative to the longitudinal axis 72.

Figure 1B:
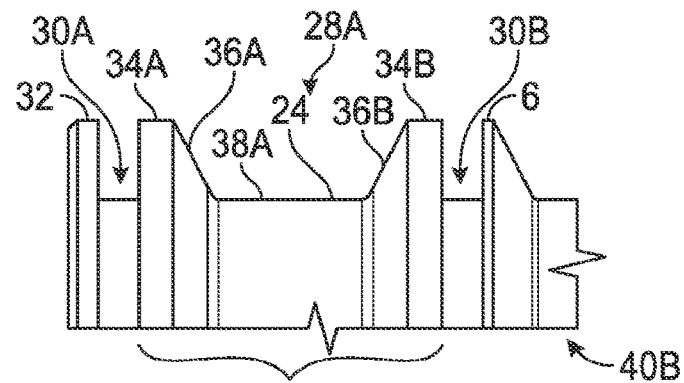
FIG. 1B is a schematic partial side view of a typical spool slidably engaged in a bore of the spool valve.
Figure 1C:
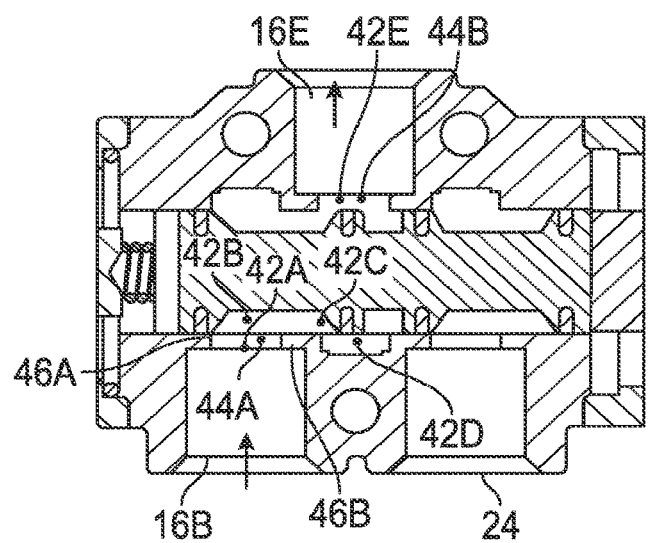
FIG. 1C is a schematic illustration of a typical flow path in the spool valve of FIG. 1A with at least one choke zone in the flow path
Figure 5:
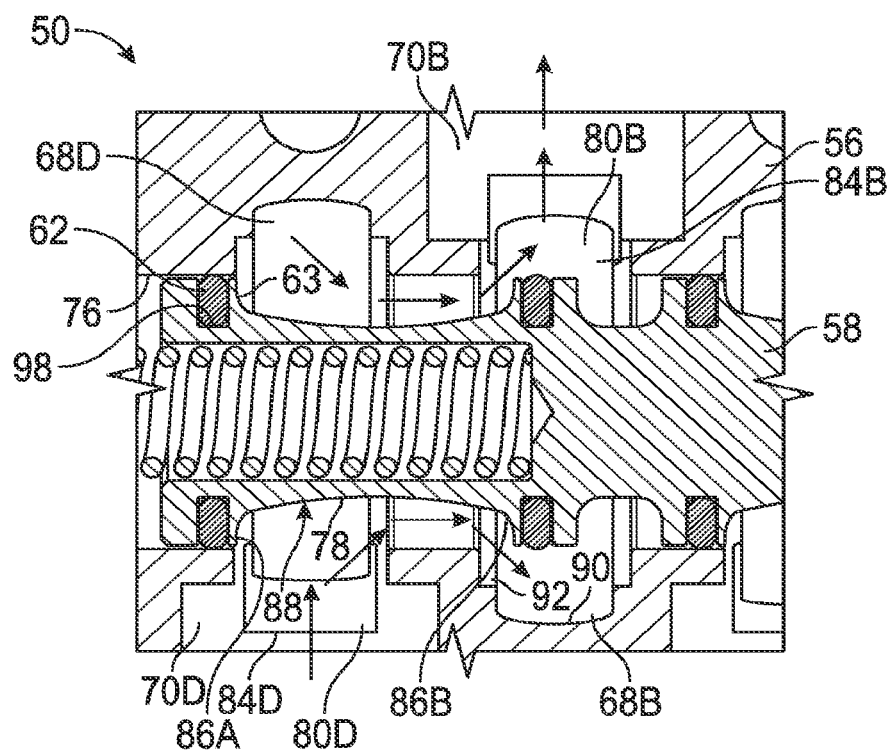
FIG. 5 is a cross-sectional schematic view of the exemplary spool valve of FIG. 2 with an exemplary flow path from an inlet through an outlet.
Figure 6:
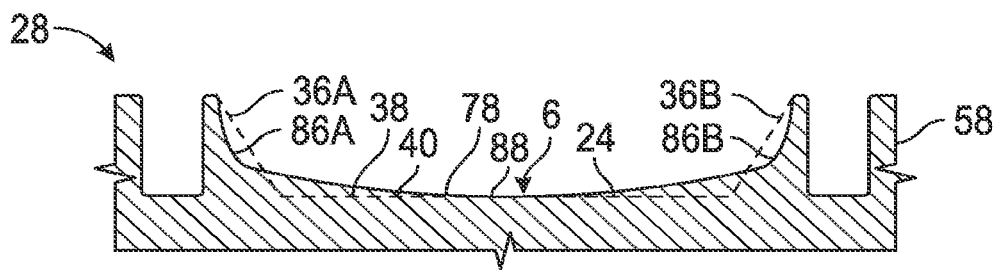
FIG. 6 is a cross-sectional schematic diagram of the exemplary spool concave surface between seals compared with a typical spool surface.

FIG. 5 is a cross-sectional schematic view of the exemplary spool valve of FIG. 2 with an exemplary flow path from an inlet through an outlet. FIG. 6 is a cross-sectional schematic diagram of the exemplary spool concave surface between seals compared with a typical spool surface. FIG. 6 shows a contrast between the spool flow profile 40 of an existing valve described in FIG. 1A compared to the spool flow profile 78 in the exemplary embodiment of the present invention. A flow through the exemplary valve can be further increased in capacity by providing contour shapes on the body and its bore 76 (described above with the spherical internal groove) and/or providing contoured shapes on the spool 58. As shown in more detail in FIG. 6, the spool 58 differs from the spool 6 of the existing valve 2 described in FIGS. 1A and 1B by providing contoured surfaces to promote greater flow. Specifically, the spool 6 of the existing valve 2 includes an angled wall tapered surface 36A on one end and an angled wall tapered surface 36B of about 45 degrees with a flat cylindrical portion 24 of the spool barrel 38 therebetween.

In contrast to the spool 6 of the existing valve, the spool 58 of the exemplary valve of the invention provides a contoured recess 86A on a seal wall 63 that is adjacent a seal 62 in a seal groove 98 on one end and a similar contoured recess 86B on the other end with a similar seal wall. The contoured recesses can have a concave surface. Further, a concave contoured surface 88 is between the contoured recesses. The design provides two benefits. First, the shape of the spool 58 promotes a more laminar, less turbulent flow. In other words, as shown in FIG. 5, flow coming through the port, such as port 70D, flows past the contoured recess 86A and smoothly curves through the concave contour 88 and then bends smoothly around the contour recess 86B as it flows into the next flow volume, such as the internal groove 68. The term "concave" is used broadly to include a curved surface or stepped surfaces with incrementally angled faces that collectively may resemble a concave surface. Similarly, the contour recess 86 can be curved or incrementally stepped with a series of incrementally angled faces so that in the aggregate it resembles a contoured surface. Each of the surfaces seeks to minimize the flow turbulence as the flow changes direction between the port, spool, bore, and other various flow portions of the valve.

Figure 7:
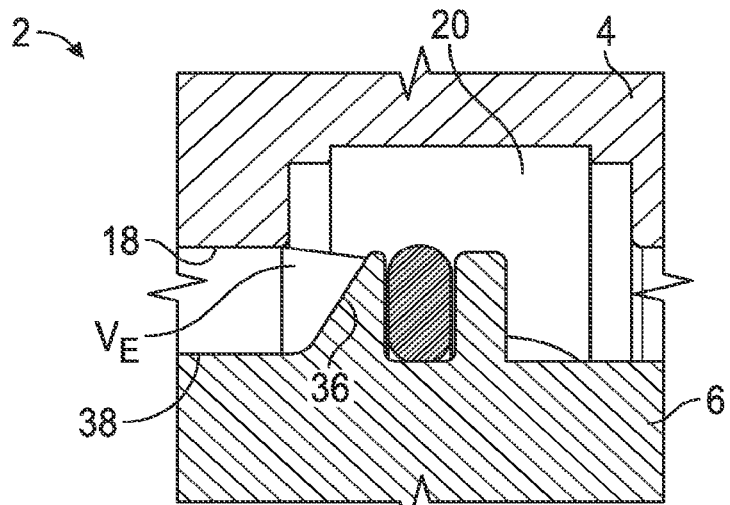
FIG. 7 is a cross-sectional schematic diagram of a flow volume of a flow path in the existing valve of FIG. 1A.
Figure 8:
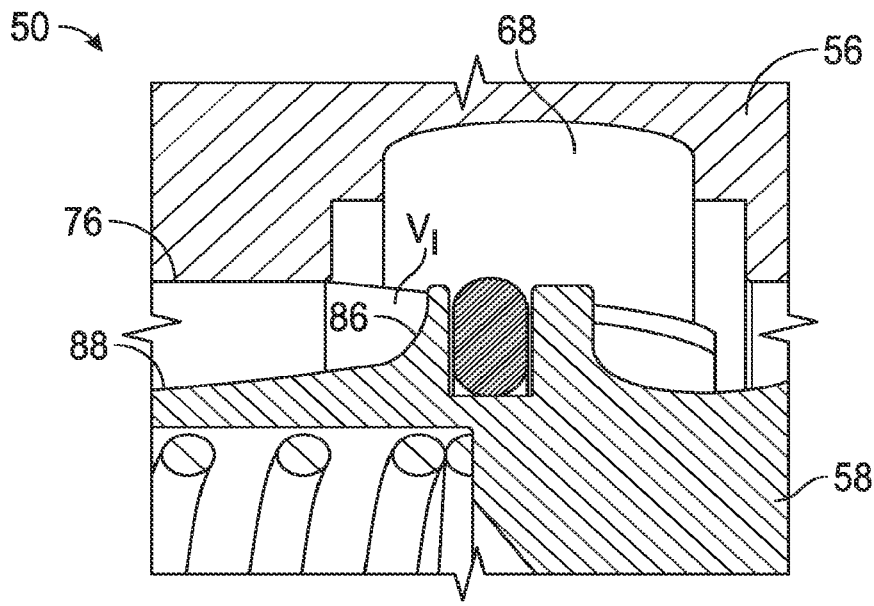
FIG. 8 is a cross-sectional schematic diagram of a choke volume of a flow path in the exemplary valve of FIG. 2.

FIG. 7 is a cross-sectional schematic diagram of a flow volume of a flow path in the existing valve of FIG. 1A. FIG. 8 is a cross-sectional schematic diagram of a choke volume of a flow path in the exemplary valve of FIG. 2. As mentioned above, regarding FIGS. 5 and 6, the change in the spool flow profiles can increase the flow volume capacity of the valve. For example, the flow volume of the existing valve of FIG. 1A could pass between the closest point of the bore 18 of the valve body 4 towards the wall taper surface 36 of the spool barrel 38 before entering the internal groove 20. That existing valve volume is designated $V_E$. In contrast, the exemplary valve of the present invention has a larger flow volume designated $V_I$ that is formed between the closest point of the bore 76 of the body 56 towards the concave contoured surface 88 and the contoured recess 86 of the spool 58 before entering the internal groove 68. (Flows in the reverse direction would have a similar flow volume exiting the internal groove into the flow volume between the bore and spool.) The increased volume of the exemplary valve allows a higher throughput. In addition, the smoother flow profile shown in FIG. 8 allows less turbulence as well.

Figure 9A:
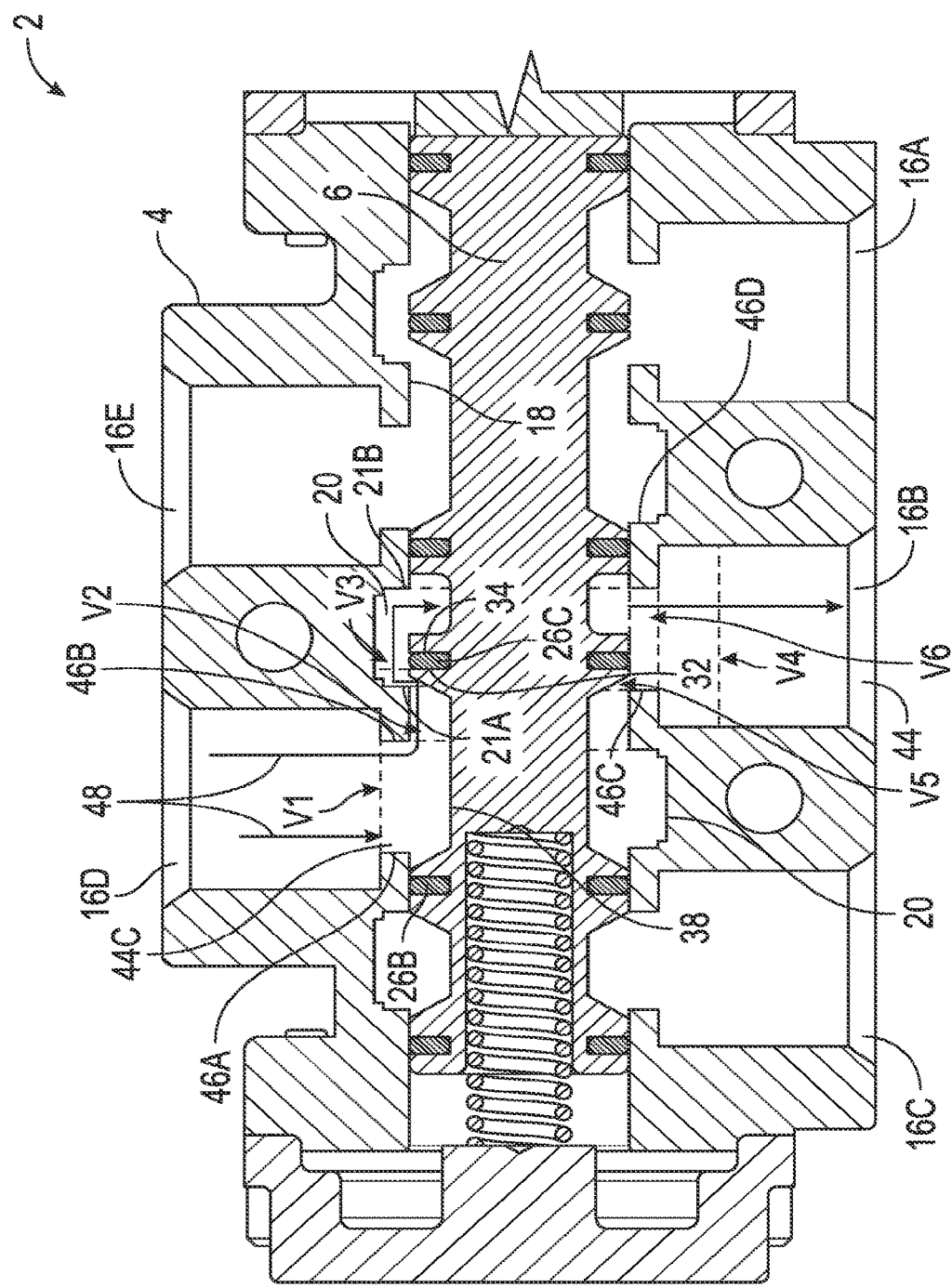
FIG. 9A is a cross-sectional schematic diagram of a series of flow volumes of a flow path in the existing valve of FIG. 1A.
Figure 9B:
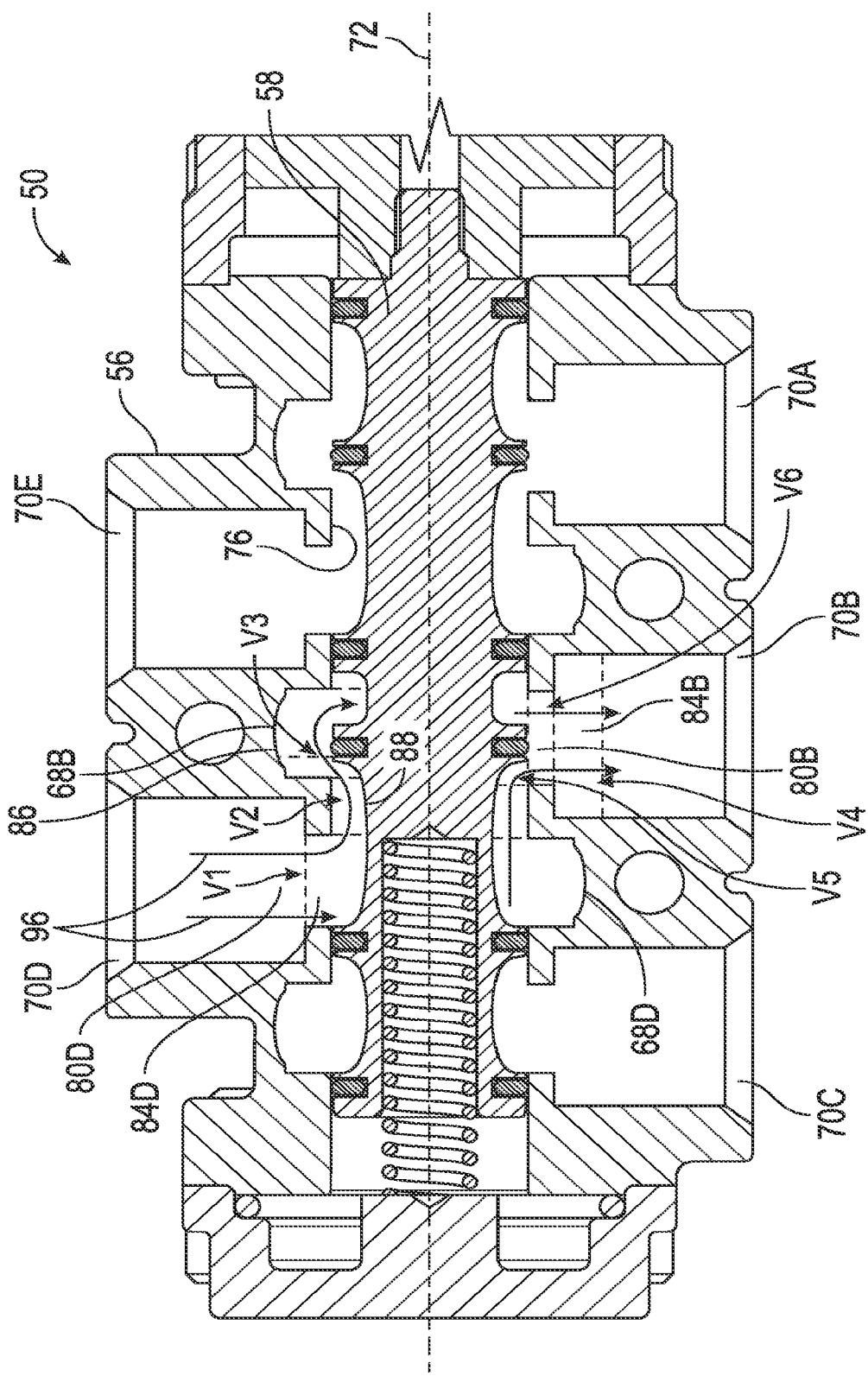
FIG. 9B is a cross-sectional schematic diagram of a series of flow volumes of a flow path in the exemplary valve of FIG. 2.

FIG. 9A is a cross-sectional schematic diagram of a series of flow volumes of a flow path 48 in the existing valve of FIG. 1A. FIG. 9B is a cross-sectional schematic diagram of a series of flow volumes of a flow path 96 in the exemplary valve of the invention of FIG. 2. FIG. 9C is a chart of comparative sizes of the flow volumes of the valves of FIGS. 9A and 9B. One way of illustrating the invention's aspects is to divide the flow paths 48 and 96 into corresponding flow volumes for comparison between the existing valve of FIG. 1A and the exemplary valve of the invention of FIG. 2. The flow paths 48 and 96 of the valves are similar in overall flow direction but with the differences described herein on flow volume and efficiency with a higher flow coefficient. In this example, both valves are one-quarter inch NPT size valves and thus have the same size ports for equitable comparison.

In FIG. 9A, the previously identified ports 16A-16E are labeled. The ports are formed in the body 4 with the spool 6 disposed in the bore 18 of the body. The flow volumes V1-V5 represent the transverse planes between the body and the spool of defined longitudinal length starting with flow through a port, across a spool flow profile, into an internal groove, and then out through an opening into an adjacent port. The flow volume V6 represents a volume through the opening 44 of the existing valve or opening 80 of the exemplary valve of the invention. The flow volumes can be defined in this example with the flow direction proceeding from the port 16D in the existing valve of FIG. 9A or the port 70D in the exemplary valve of the invention of FIG. 9B, through the valves, and out the ports 16B and 70B, respectively. Thus, upstream and downstream is relative to the exemplary flow and the designations can be adjusted for flow in the reverse direction, even though the volumes would remain the same.

For purposes herein, flow volume V1 of the existing valve of FIG. 9A is defined as the flow volume radially from the bottom of the port 16 starting at the opening 44 and the volume of the internal groove 20 to the surface of the spool 6, and longitudinally from the wall taper surface 46A and any available flow volume generally below the surface 46A on the left end (in the orientation of FIG. 9A) to a transverse plane from the edge 46B of the opening 44C on the right end. Flow volume V1 ignores a negligible volume of the annular space between the groove wall adjacent the seal 26B and the bore 18. Flow volume V2 is defined radially between the bore 18 and the spool 6, and longitudinally from a downstream transverse plane (on the left) at the edge 46B to a downstream transverse plane (on the right) at the edge 21A of the internal groove 20. Flow volume V5 is defined radially between the internal groove 20 and the spool 6, and longitudinally between a transverse plane at the upstream edge 21A of the internal groove 20 to a transverse plane at the downstream edge of the groove wall 34 prior to the sealing point of the seal 26. Flow volume V3 is defined from the internal groove 20 and a projected boundary across the inward edges 46 of the port opening 44C radially inward to the spool 6, and longitudinally between a transverse plane at the upstream edge of the groove wall 34 after the sealing point of the seal 26C to the downstream edge 21B of the internal groove 20. Flow volume V6 is defined with a cross-section volume across the opening 44D of the port 16B having a thickness of the edge 46.

In a similar way, flow volumes V1-V6 can be defined regarding the exemplary valve of the invention shown in FIG. 9B by substituting corresponding elements in the respective definitions. In general, the definitions from the exemplary valve would have a similar flow path, starting from an inlet port 70D, through an opening 80D having a first transverse port window 84D, into the bore 76 of the body 56 having a first internal groove 68D, through a turn from a transverse flow direction that is transverse to the longitudinal centerline 72 to a longitudinal flow direction over the concave contoured surface 88 of the spool 58, turn from a longitudinal flow direction to a transverse flow direction into a second internal groove 68B, and through a second opening 80B with a second transverse port window 84B and out of an outlet port 70B. A flow path between other ports could be similarly described and corresponding flow volumes would correspond in a similar manner.

As shown in FIG. 9C, the exemplary valve in FIG. 9B has increased flow volumes over the existing valve in FIG. 9A for all flow volumes, except for flow volume V2 with an explanation of the reason provided below. For the exemplary valve of FIG. 9B compared to the existing valve of FIG. 9A, flow volumes V1 is larger, V3 is larger, V4 is larger, V5 is larger, and V6 is larger. In this example, flow volume V1 is 34% larger, flow volume V3 is 54% larger, flow volume V4 in the port is 26% larger, flow volume V5 is 154% larger, and flow volume V6 is 41% larger in the exemplary valve 50. Yet, in spite of the internal increases, the valve is still the same nominal size valve (in this example, a ¼" NPT valve). The difference is the internal passageways that have been contoured through various ways to make additional total flow volumes and more laminar flow paths. Further, the existing valve design shown in FIG. 1A has the smallest internal volume between the spool and the valve body at flow volume V5, which represents a "choke volume" or overall restriction for the flow through the valve compared to the other flow volumes. (The exit flow volume V6 is smaller than the flow volume V2 or V5 in each of the respective valves, but is not considered a choke volume for the internal flow paths between the respective spools and the valve bodies.) Thus, flow is limited through the flow volume V5 of the existing valve in FIG. 9A. Significantly, the choke volume V5 occurs at a location of the flow path that also includes a turn in the flow path. Specifically, the flow path passes through the flow volume V2 and then turns radially outwardly in a transverse direction to the longitudinal centerline through the flow volume V5 to enter the flow volume V3. The combination of a choke with the turn in the same flow volume V5 of the existing valve results in a high degree of turbulence.

In contrast, the design of the exemplary valve avoids a choke volume at the turn in the flow. The location of the choke volume V2 in the exemplary valve is at a different portion of the flow path 96 than the choke volume V5 of the existing valve in its corresponding flow path 48. Particularly, the choke volume V2 in the exemplary valve is at a location in the flow path where the flow has passed through flow volume V1 and turned to flow longitudinally through the flow path into the flow volume V2. The next substantial turn in flow does not occur until after the flow passes through V2 and enters the flow volume V5 to turn into the internal groove 68. Thus, the inlet and the outlet of the choke volume V2 are generally parallel to the flow within the choke volume V2 in the exemplary valve 50. Turbulence is reduced, a higher flow coefficient results, and higher flow can be obtained.

The design of the exemplary valve consciously chokes a different flow volume in the internal flow path between the spool and the valve body, namely flow volume V2, rather than the flow volume V5 in the existing valve. Thus, flow volume V2 in the exemplary valve of the invention is smaller than V2 in the existing valve. However, in comparing the choke volume V5 of the existing valve with the choke volume V2 of the exemplary valve, one can see that the exemplary valve choke volume V2 is more than twice the size (in this example, 224% of the size) of the existing valve choke volume V5. Thus, the exemplary valve has a higher flow rate at least because its flow through the choke volume V2 is significantly more than the choke volume V5 of the existing valve. Even with the reduced flow volume V2 of the exemplary valve compared to the flow volume V2 in the existing valve, the overall flow through the exemplary valve is improved.

Additionally, the choke volume V2 of the exemplary valve 50 has a gradual constriction due to the concave contoured surface of the spool profile 78 in FIG. 9B, described herein. However, the choke volume V5 of the existing valve 2 in FIG. 9A has a much higher rate of constriction by the steep angle of the seal groove walls that turn the flow into the internal groove. The higher rate of change of the existing valve increases turbulence whereas the slower rate of change in the exemplary valve decreases turbulence. Decreased turbulence promotes an increased flow capacity.

Still further, in the exemplary valve after the flow passes through the flow volume V2 and enters flow volume V5, the flow encounters the contoured recess 86. The contoured recess 86 is formed with a concave surface that makes a smooth transition from the longitudinal flow to the radial flow into the internal groove 68. The smooth transition by the contoured recess 86 also contributes to less turbulence with more laminar flow, higher flow coefficient, and increased flow capacity of the valve.

For present discussion purposes, flow through the flow volume V3 enters the flow volume V6 across the opening of the port. The flow volume V6 in the exemplary valve includes the transverse port windows 84, described above which increases the flow volume and flow capacity. The flow then flows through flow volume V4 and out through the relevant port, such as the port 70B in this example.

As described in reference to FIGS. 9A and 9B, the exemplary valve of the invention shifts the choke volume to flow volume V2, where the flow into the flow volume V2 is more laminar prior to the turn that is created in flow volume V5. In contrast, the existing valve creates a choke flow zone V5 in the same volume where a turn in direction of the flow occurs and where additional turbulence is created.

Figure 10A:
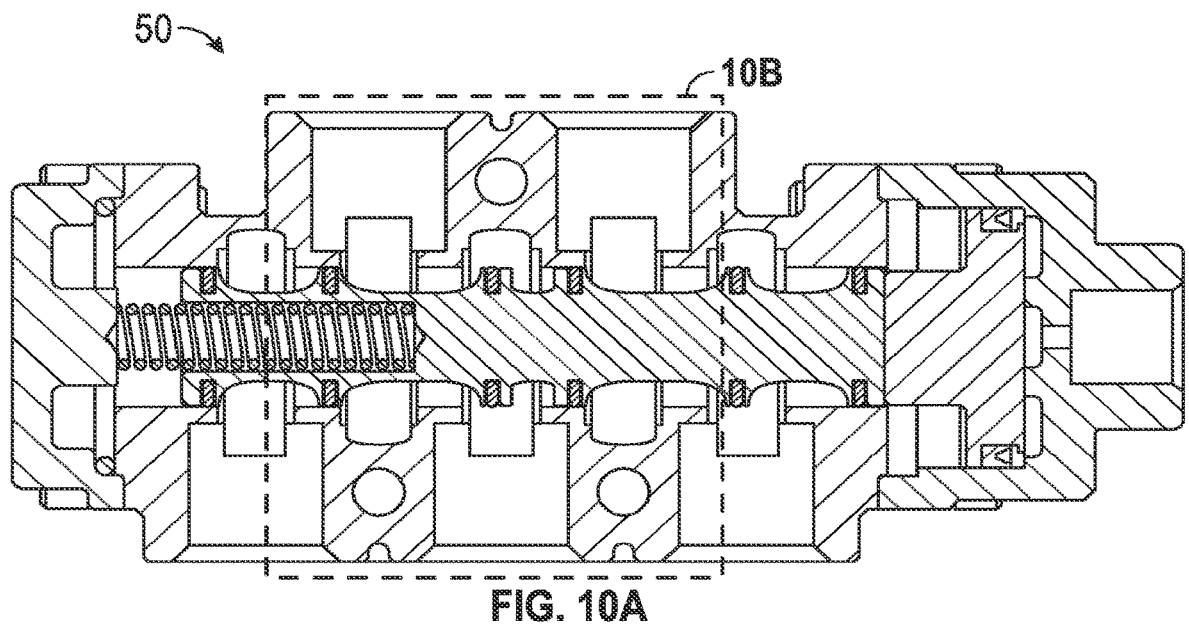
FIG. 10A is a cross-sectional schematic overview of the exemplary valve illustrating a location for a detail view.
Figure 10B:
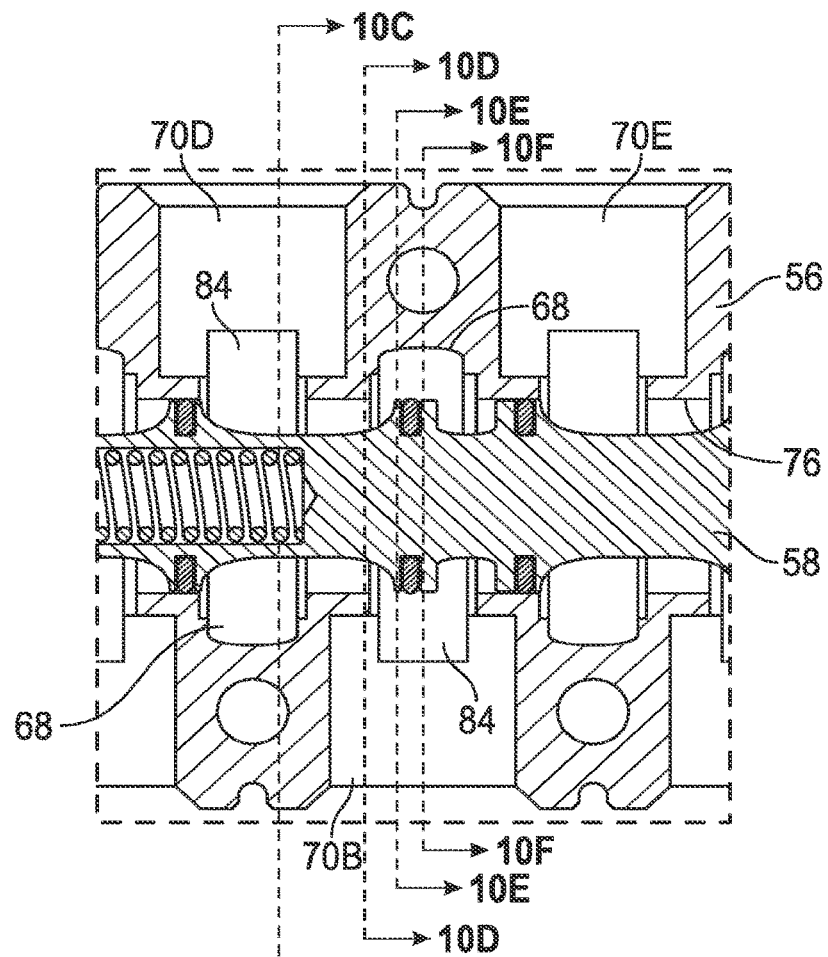
FIG. 10B is a cross-sectional schematic view of a detailed view of the valve of FIG. 10A illustrating locations of sectional views.
Figure 10C:
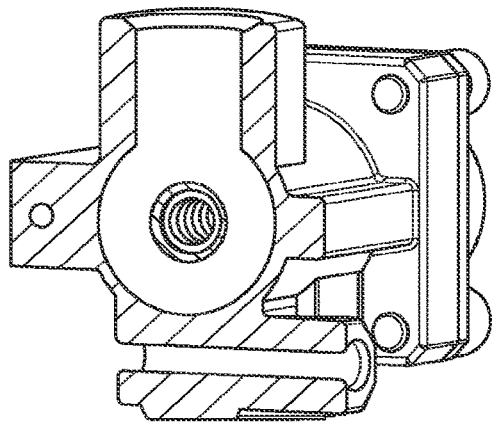
FIG. 10C is a cross-sectional schematic view of a portion of a flow path across section 10C.
Figure 10D:
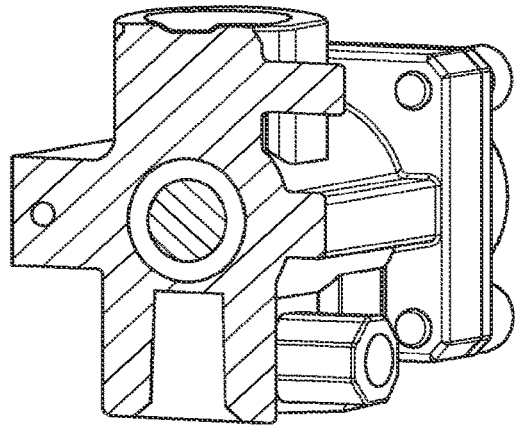
FIG. 10D is a cross-sectional schematic view of a portion of a flow path across section 10D.
Figure 10E:
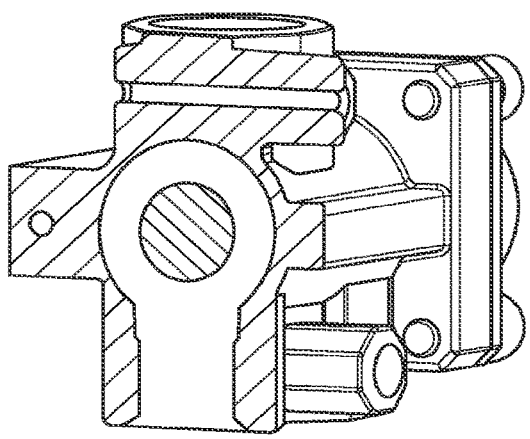
FIG. 10E is a cross-sectional schematic view of a portion of a flow path across section 10E.
Figure 10F:
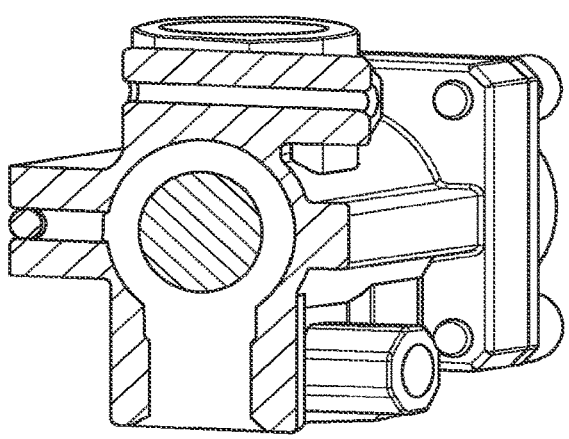
FIG. 10F is a cross-sectional schematic view of a portion of a flow path across section 10F.

FIG. 10A is a cross-sectional schematic overview of the exemplary valve showing the location of a detailed view in FIG. 10B. FIG. 10B is a cross-sectional schematic view of a detailed view of the valve of FIG. 10A illustrating locations of sectional views in FIGS. 10C-10F. FIG. 10C is a cross-sectional schematic view of a portion of a flow path across section 10C. FIG. 10D is a cross-sectional schematic view of a portion of a flow path across section 10D. FIG. 10E is a cross-sectional schematic view of a portion of a flow path across section 10E. FIG. 10F is a cross-sectional schematic view of a portion of a flow path across section 10F.

FIG. 10B provides a detailed view of the portion of the overall valve 50 as indicated. Section 10C, shown in FIG. 10C, shows a cross-section through the port 70D that includes the transverse port window 84, passes through the internal groove 68, and then through the remainder of the valve body 50. Section 10D, shown as FIG. 10D, passes through the body 56, through the space between the bore 76 of the body and the cross-section of the spool 58, and through the remainder of the body aligned with the port 70B. Section 10E, shown as FIG. 10E, passes through a portion of the body 50 and internal groove 68, a larger portion of the spool 58, through the transverse port window 84, and the port 70B. Section 10F, shown as FIG. 10F, passes through a similar portion of the valve but at the largest portion of the internal groove 68, the largest portion of the spool 58, the transverse port window 84, and the port 70B.

Figure 11:
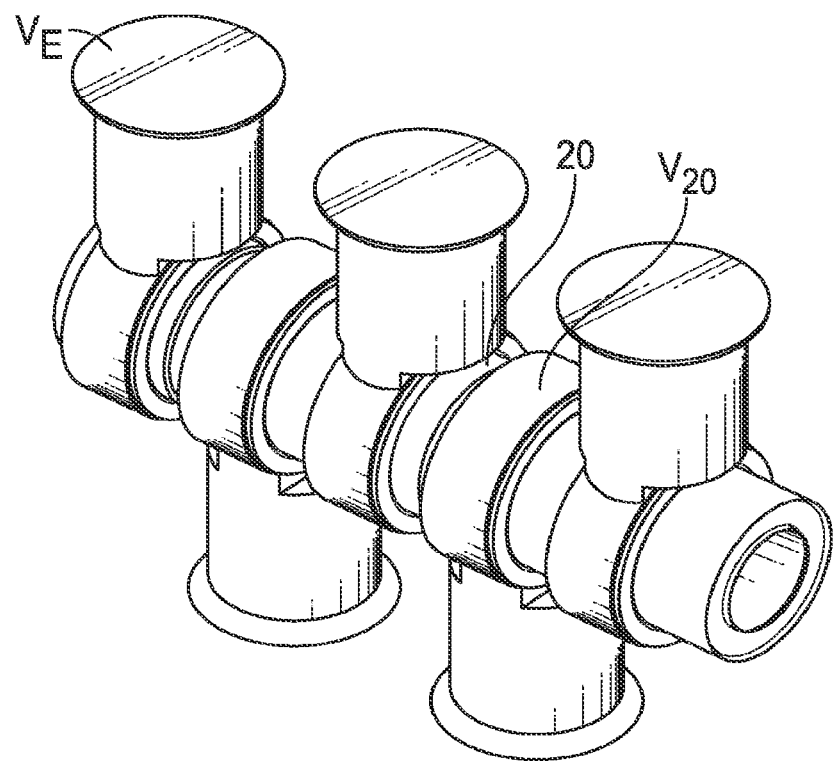
FIG. 11 is a perspective schematic view illustrating the volumetric shape of a total flow zone in the existing valve of FIG. 1A.
Figure 12:
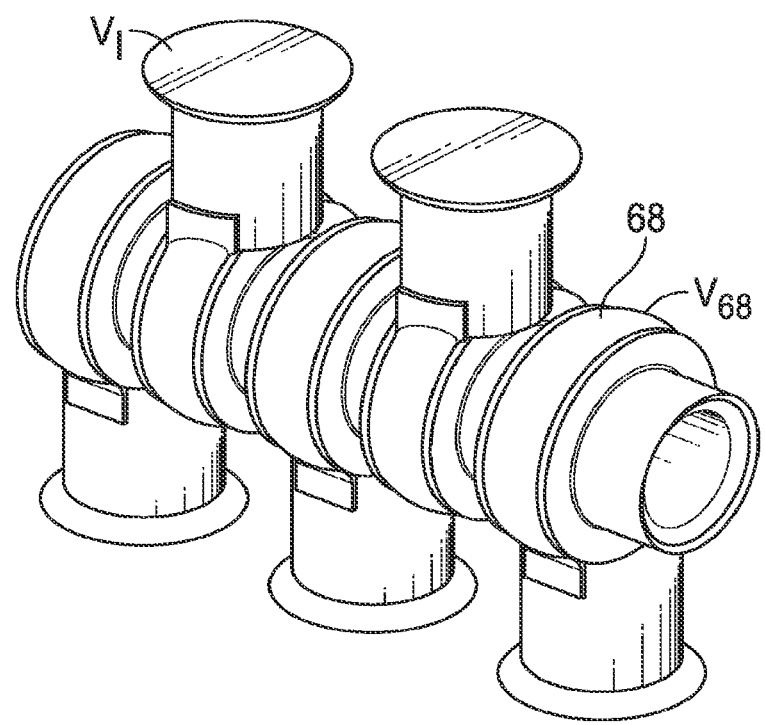
FIG. 12 is a perspective schematic view illustrating the volumetric shape of a total flow zone in the exemplary valve of FIG. 2.

FIG. 11 is a perspective schematic view illustrating the volumetric shape of a total flow volume in the existing valve of FIG. 1A. FIG. 12 is a perspective schematic view illustrating the volumetric shape of a total flow volume in the exemplary valve of FIG. 2. For illustrative purposes, the figures show the difference between the existing valve described in FIG. 1A and other figures herein compared to the exemplary embodiment of the valve described in FIG. 2 and other figures herein. The figures represent the total volume that is available for flow through each respective valve. Thus, for the existing valve shown in FIG. 11, the total volume $V_E$ can be compared to the total volume $V_I$ of the invention of the exemplary embodiment shown in FIG. 12. Visually, one can see in at least one aspect the significant difference in the volume of an internal groove 20 of the existing valve, $V_{20}$, compared to volume $V_{68}$ of the internal groove 68 in FIG. 12. The diameter is larger and the shape is spherical rather than cylindrical. The additional volume provides a larger flow path and a smoother flow path. In the exemplary valve, the flow volume available for flow through the valve is about 14,800 mm$^3$, while the flow volume for the existing valve is about 12,000 mm$^3$. So, there is volumetric increase of about 19%.

Figure 13:
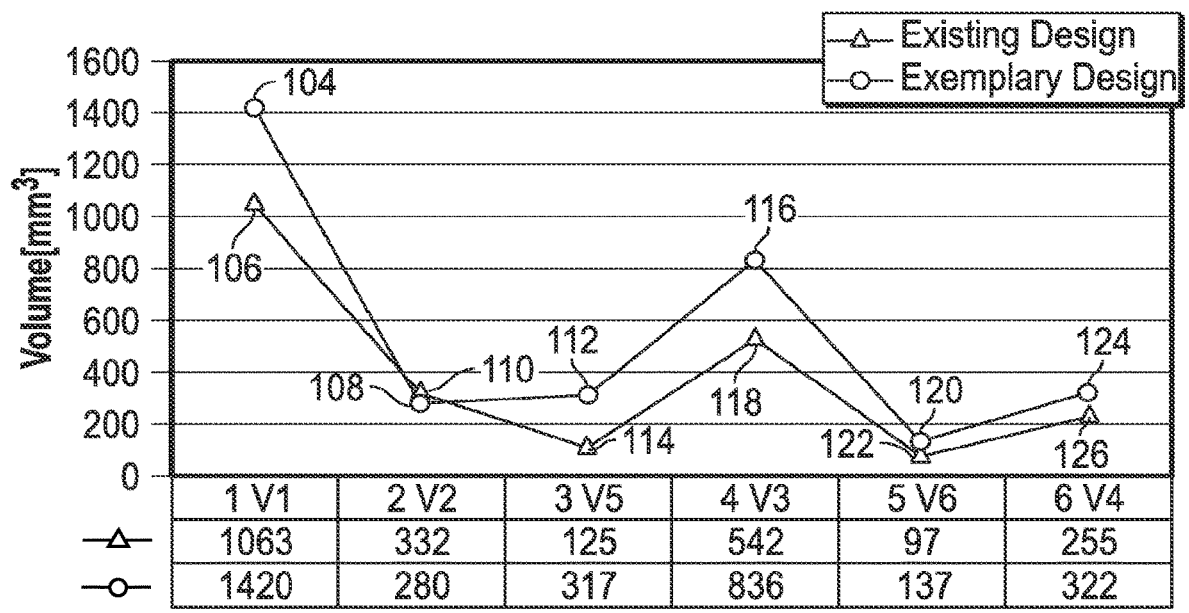
FIG. 13 is a chart showing the changes in flow volumes for the existing valve shown in FIG. 1A compared to the new exemplary valve shown in FIG. 2.

FIG. 13 is a chart showing the changes in flow volumes for the existing valve shown in FIG. 1A compared to the new exemplary valve shown in FIG. 2. The values are based on the flow volumes described in FIG. 9A for the existing valve, FIG. 9B for the exemplary valve, and the table in FIG. 9C. As shown, the volumes for the same size ¼ inch valves are higher in each flow volume for the new exemplary valve compared to the existing valve. The exception is for flow volume V2 that had been explained herein, where the flow volume V2 is the smallest internal volume between the spool and the valve body as the "choke volume" in the new exemplary valve compared to flow volume V5 as the choke volume for the existing valve. When the choke volumes are compared, flow volume V2 of the exemplary valve is advantageously over twice the size of the choke volume V5 of the existing valve.

Specifically, at point 104 for the exemplary valve 50, the flow volume V1 is about 1420 mm$^3$, whereas at point 106 for the existing valve 2, the flow volume is about 1063 mm$^3$, for a gain of 34% over the existing valve. At point 108 for the exemplary valve, the flow volume V2 is about 280 mm$^3$ and is slightly less (16%) than at point 110 for the existing valve with the flow volume V2 of about 332 mm$^3$, due to a conscious decision to create a choke volume in a parallel flow portion of the flow path for the exemplary valve 50 rather than at the choke volume V5 of the existing valve. At point 112 for the exemplary valve, the flow volume V5 is about 317 mm$^3$, whereas at point 114 for the existing valve, the flow volume is about 125 mm$^3$, for a gain of 154% over the existing valve. At point 116 for the exemplary valve, the flow volume V3 is about 836 mm$^3$, whereas at point 118 for the existing valve, the flow volume is about 542 mm$^3$, for a gain of 54% over the existing valve. At point 120 for the exemplary valve, the flow volume V6 is about 137 mm$^3$, whereas at point 122 for the existing valve, the flow volume is about 97 mm$^3$, for a gain of 41% over the existing valve. At point 124 for the exemplary valve, the flow volume V4 is about 322 mm$^3$, whereas at point 126 for the existing valve, the flow volume is about 255 mm$^3$, for a gain of 26% over the existing valve.

Figure 14:
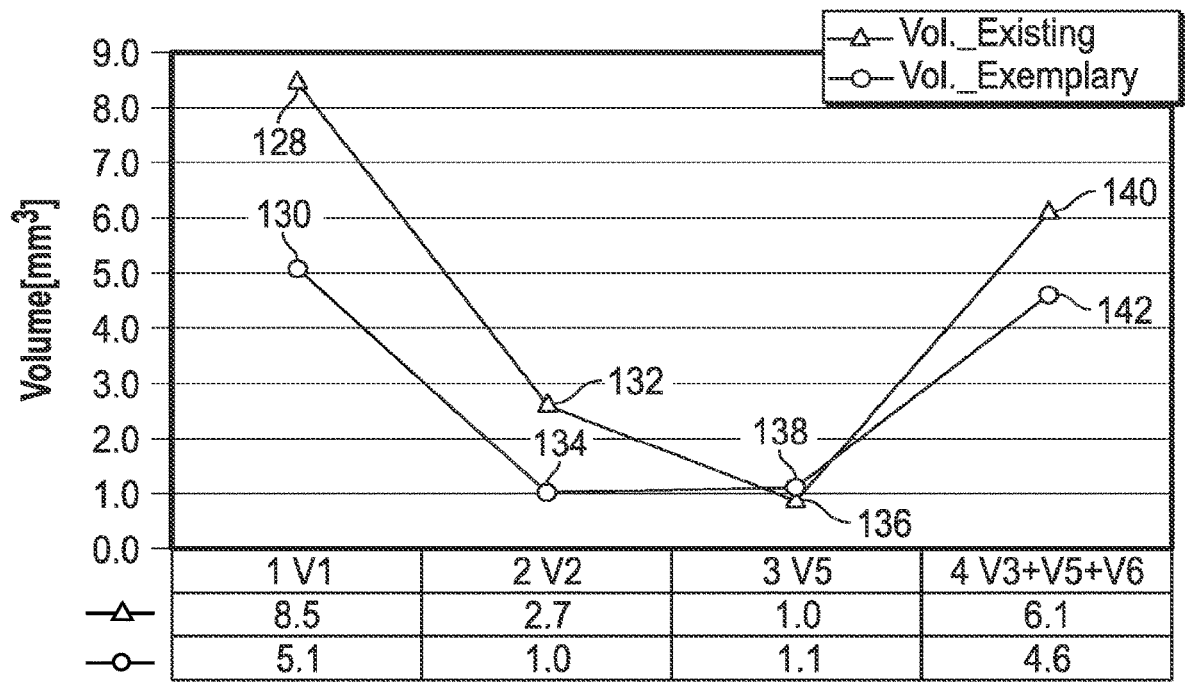
FIG. 14 is a chart showing a comparison of ratios of specific flow volumes of each of the valves in FIG. 1A and FIG. 2 divided by their respective choke volumes to establish normalized ratios for the valves.

FIG. 14 is a chart showing a comparison of ratios of specific flow volumes of each of the valves in FIG. 1A and FIG. 2 divided by their respective choke volumes to establish normalized ratios for the valves. The horizontal axis of four columns illustrates different flow volumes. Referencing FIGS. 9A and 9B, Column 1 represents the flow volume V1 of FIGS. 9A and 9B. Similarly, Column 2 represents the flow volume V2 in each Figure, Column 3 represents the flow volume V5 in each Figure, and Column 4 represents the combination of flow volumes V3 plus V5 plus V6. Column 4 approximates a combined flow region of the valve that corresponds to the region of flow volume V1.

Again referencing FIGS. 9A, 9B, and 9C and the associated descriptions, the choke volume is the smallest internal flow volume. The choke volume in the exemplary valve 50 is flow volume V2, which was twice the choke volume V5 of the existing valve 2. Thus, in FIG. 14, the lines represent the ratio at each of the respective flow volumes V1, V2, V5, and V3+V5+V6 for the four columns divided by the choke volume V5 for the existing valve 2 and divided by flow volume V2 for the exemplary valve 50. The slopes of the lines indicate the rate of change between the flow volumes, and, as explained below, is at least a partial predictor of the amount of relative turbulence in each valve.

In the graph of the exemplary valve, volumes appear lower in position, because the relativistic point (choke volume V2) in the exemplary valve 50 is much larger than the relativistic point (choke volume V5) for the existing valve 2. Because the relativistic point (choke volume V2) is much larger and appears in the denominator, then the volumetric ratios for the exemplary valve results in a smaller number than for existing valves. Smaller ratios represent more gradual volumetric transitions from each zone in the flow path. In the existing valve, the large ratios (8.5, 2.7, and 6.1 for columns 1, 2, and 4 with column 3 being the normalizing column) are caused by the small relativistic point (choke volume V5) with higher flow losses in transient flow paths between the flow volumes. The exemplary valve volumetric ratios are much smaller in comparison (5.1, 1.1, and 4.6 for columns 1, 3, and 4 with column 2 being the normalizing column) that result from the larger relativistic point (choke volume V2) compared to the other flow volumes. In particular transition from volume V2 to V5 is notably gradual in the exemplary valve, therefore reducing transient fluid flow loses during a transition in path from a parallel direction to a perpendicular direction. As a result, this gradual change in the relativistic volume represents less resistance in the flow path and thereby reduction in flow losses in a transient flow path.

Starting at point 128 for the existing valve, the slope from point 128 for flow volume V1 to point 132 for the flow volume V2 is steeper than the equivalent flow volume change for the exemplary valve from point 130 to point 134 for flow volumes V1 to V2. The faster slope of the existing valve indicates a more rapid transition and therefore more turbulence. More turbulence generally indicates higher friction and less flow capacity. Thus, the change between the flow volume V1 to flow volume V2 is better in the exemplary valve.

The transition shown from point 132 to point 136 shows the transition from the flow volume V2 to the flow volume V5 for the existing valve. The transition is still a relatively steep downward sloped surface resulting in a higher turbulence transition and less flow capacity. By contrast, the transition from the point 134 to the point 138 shows the transition from the flow volume V2 to the flow volume V5 for the exemplary valve. This transition is virtually flat or even increasing slightly. The flow is more uniform and less turbulent with less friction and higher flow capacity.

The transition shown from point 136 to point 140 shows the transition from the flow volume V5 to the combined flow volume of V3 plus V5 plus V6 for the existing valve and has another steep incline. This steep inclination again indicates a design that likely causes more turbulence, more resistance and less laminar flow. In contrast, the transition from point 138 to point 142 for the exemplary valve shows the transition from the flow volume V5 to the combined flow volume of V3 plus V5 plus V6 for the exemplary valve and shows less steep inclination with likely less turbulence and more flow capacity.

Figure 15:
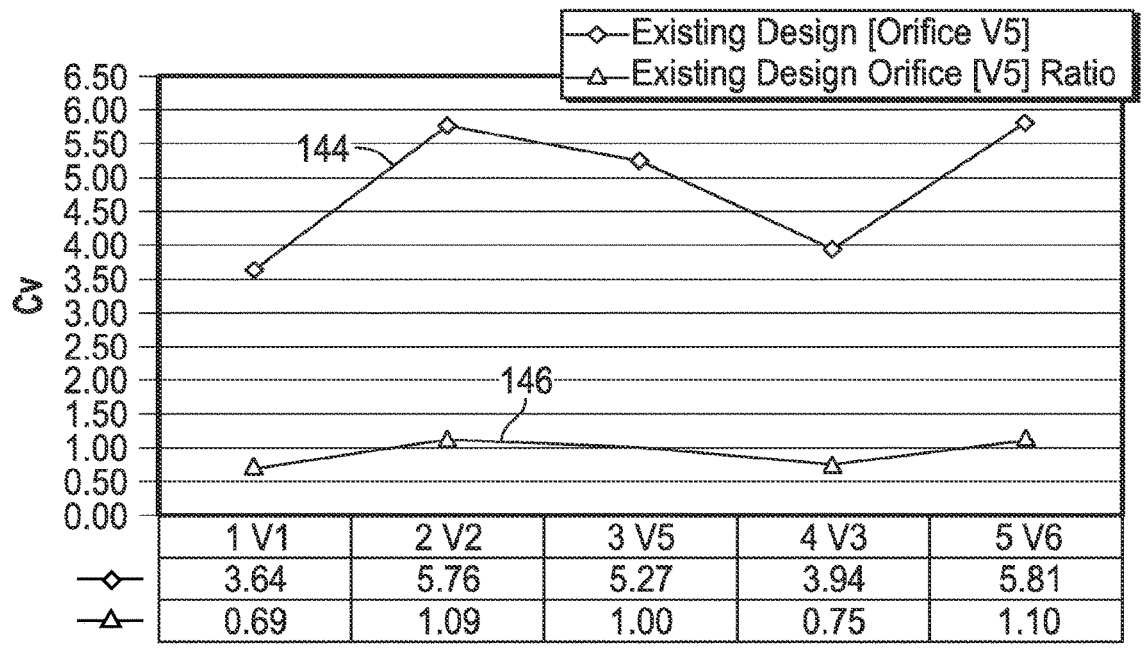
FIG. 15 is a chart showing the Cv at the different flow volumes identified in FIG. 9A for the existing valve 2 and a Cv ratio normalized to the choke volume V5 of the existing valve.

FIG. 15 is a chart showing the Cv at the different flow volumes identified in FIG. 9A for the existing valve 2 and a Cv ratio normalized to the choke volume V5 of the existing valve. The Cv value is proportional to the ability of the particular flow zone to flow fluid through such zone. The Cv for the line 144 for each of the flow zones is erratic from low to high to low and again to high. The overall flow can be described as relatively turbulent without smooth flow transitions between the flow volumes. The lowest Cv is about 3.6 and the highest Cv is about 5.8. Line 146 represents the Cv ratio of the flow throughput in comparison to a relativistic point (choke volume V5). The normalized Cv for the line 146 still indicates an erratic pattern but with less amplitude changes.

Figure 16:
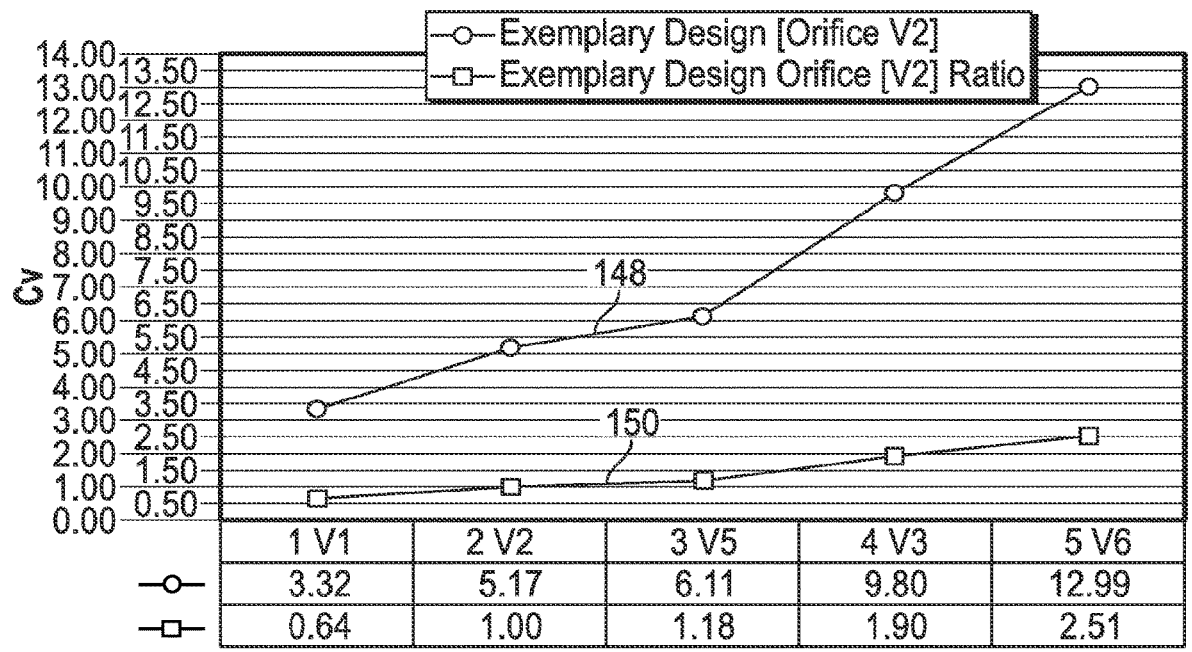
FIG. 16 is a chart showing the Cv at the different flow volumes identified in FIG. 9B for the exemplary valve 50 and a Cv ratio normalized to the choke volume V2 of the exemplary valve.

FIG. 16 is a chart showing the Cv at the different flow volumes identified in FIG. 9B for the exemplary valve 50 and a Cv ratio normalized to the choke volume V2 of the exemplary valve. The Cv for the line 148 for each of the flow zones is relatively straight from low to high. The overall flow can be described as relatively laminar with smooth flow transitions between flow volumes. The lowest Cv is about 3.3 and the highest Cv is about 13.0 with a gain of about 124% over the highest Cv of the existing valve. Line 150 represents the Cv ratio of the flow throughput in comparison to a relativistic point (choke volume V2). The normalized Cv for the line 150 still indicates a smooth transition to continually higher Cv ratios.

It is understood that the above comparisons can be extended to other valve sizes with the attendant change in flow volumes and total volumes with the resulting flow coefficients. In general, the teachings herein can be applied to other sizes of valves.

The order of steps can occur in a variety of sequences unless otherwise specifically limited. The various steps described herein can L combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. For example, other sizes could be similarly designed with the resulting differences in flow volumes described above. Obvious modifications and alterations to the described embodiments are available to those with ordinary skill in the art given the teachings disclosed herein. In conformity with the patent laws, the claims determine the scope or range of equivalents, rather than the disclosed exemplary embodiments, with the understanding that other embodiments within the scope of such claims exist.

What is claimed is:

1. A spool valve comprising:
  a body having a bore and a plurality of internal grooves that extend radially outwardly from an interior surface of the bore transversely to a longitudinal centerline of the body, the plurality of internal grooves including first and second internal grooves that are radially bounded by spherically shaped surfaces of the body and disposed longitudinally along the bore;
  a plurality of ports formed in the body transversely to the longitudinal centerline of the body, the plurality of ports including inlet and outlet ports; and
  a spool slideably engaged in the bore;
  wherein the inlet port is in fluid communication with a first opening in the interior surface of the bore, the first opening being disposed between first and second seal edges, the first seal edge being fluidically upstream of the second seal edge;
  wherein the outlet port is in fluid communication with a second opening in the interior surface of the bore, the second opening being disposed between the second seal edge and a third seal edge, the second seal edge being fluidically upstream of the third seal edge;
  wherein the inlet port includes a first port window comprising a portion of the spherically shaped surface bounding the first internal groove that passes through the first opening in the interior surface of the bore and forms a spherically shaped transition from a portion of the inlet port to the bore;
  wherein the outlet port includes a second port window comprising a portion of the spherically shaped surface bounding the second internal groove that passes through the second opening in the interior surface of the bore and forms a spherically shaped transition from a portion of the outlet port to the bore;
  wherein the spool comprises a first seal configured to couple to the first seal edge, a second seal configured to couple to the second seal edge and a profiled portion disposed between the first and second seals, the profiled portion being configured to route fluid from the inlet port to the outlet port when the valve is in an open position;
wherein the profiled portion of the spool comprises a concave radially exterior surface;
wherein the first and second internal grooves have radially outermost surfaces; and
wherein the spherically shaped surfaces of the body that radially bound the first and second internal grooves include the radially outermost surfaces.

2. The valve of claim 1, further comprising:
a plurality of seal grooves in the spool, the plurality of seal grooves comprising a first seal groove having a first seal wall on a side closest to the profiled portion of the spool and a second seal groove having a second seal wall on a side closest to the profiled portion of the spool;
a first concave recess between the first seal wall and the profiled portion of the spool; and
a second concave recess between the second seal wall and the profiled portion of the spool; and
wherein the first seal is coupled to the first seal groove and the second seal is coupled to the second seal groove.

3. The valve of claim 2, wherein the first concave recess, the second concave recess and the profiled portion of the spool are contiguous and form an entirely curved spool flow profile between the first and second seal grooves.

4. The valve of claim 2, wherein the profiled portion of the spool has a radius, wherein each of the first and second concave recesses has a radius, wherein the radius of at least one of the first and second concave recesses is different from the radius of the profiled portion of the spool, and wherein each of the profiled portion of the spool and the first and second concave recesses is curved in an axial direction along the longitudinal centerline of the body.

5. The valve of claim 4, wherein the radii of the first and second concave recesses are smaller than the radius of the profiled portion of the spool.

6. The valve of claim 4, wherein the radii of the first and second concave recesses are of equal length.

7. The valve of claim 2, wherein the profiled portion of the spool has a radius, wherein each of the first and second concave recesses has a radius, and wherein each of the radii has a different center.

8. The valve of claim 1, further comprising:
a flow path fluidically between the inlet port and the outlet port, the flow path comprising a series of flow volumes, a flow path portion that is transverse to the longitudinal centerline and a flow path portion that is parallel to the longitudinal centerline; and
a choke volume in the flow path, the choke volume being the smallest of the series of flow volumes between the inlet port and the outlet port;
wherein the choke volume is disposed in the flow path portion that is parallel to the longitudinal centerline.

9. The valve of claim 1,
wherein the second opening has a flow area and a thickness;
wherein the second seal is coupled to a seal groove having a first seal groove wall upstream from a second seal groove wall;
a first flow volume between a radially exterior surface of the spool and a radially interior surface of the second internal groove, the first flow volume having, when the valve is in the open position, an upstream boundary of a plane transverse to the longitudinal centerline through an upstream edge of the second internal groove and a downstream boundary of a plane transverse to the longitudinal centerline through the first seal groove wall; and
a second flow volume equal to the flow area of the second opening multiplied by the thickness of the second opening;
wherein a ratio of the first flow volume to the second flow volume is at least 2.3.

10. The valve of claim 1, wherein the first port window has a radius about the longitudinal centerline of the body and the inlet port has a port radius, and wherein the window radius is at least 25% larger than the port radius.

11. The valve of claim 1, wherein the first port window has a radius about the longitudinal centerline of the body and the profiled portion of the spool has a radius about an axis that is transverse to the longitudinal centerline of the body, and wherein the radius of the profiled portion of the spool is greater than the radius of the first port window.

12. The valve of claim 1, further comprising a choke volume in a flow path through the valve, wherein the choke volume is disposed in the flow path fluidically between the inlet port and the outlet port at a location of flow in a longitudinal flow direction.

13. The valve of claim 12, further comprising a flow volume downstream of the choke volume wherein the flow path changes from the longitudinal flow direction to a transverse flow direction.

14. The valve of claim 13, wherein the flow volume downstream of the choke volume is substantially the same size as the choke volume.

15. The valve of claim 1, further comprising an actuator coupled to the valve.

16. The valve of claim 1,
wherein the inlet port has a flow area fluidically upstream of the first port window;
wherein the outlet port has a flow area fluidically downstream from the second port window;
wherein the first port window has a flow area greater than the flow area of the inlet port; and
wherein the second port window has a flow area greater than the flow area of the outlet port.

17. The valve of claim 1, wherein the flow area of the inlet port and the flow area of the first port window have a common longitudinal centerline, and wherein the flow area of the outlet port and the flow area of the second port window have a common longitudinal centerline.

18. The valve of claim 1, wherein the first port window is configured to increase a flow area of the inlet port in at least one direction and wherein the second port window is configured to increase a flow area of the outlet port in at least one direction.

19. A spool valve comprising:
a body having a bore and a plurality of internal grooves that extend radially outwardly from an interior surface of the bore transversely to a longitudinal centerline of the body, the plurality of internal grooves including first and second internal grooves that are radially bounded by spherically shaped surfaces of the body and disposed longitudinally along the bore;
a plurality of ports formed in the body transversely to the longitudinal centerline of the body, the plurality of ports including inlet and outlet ports;
a spool slideably engaged in the bore;
a flow path fluidically between the inlet port and the outlet port, the flow path comprising a series of flow volumes, a flow path portion that is transverse to the longitudinal centerline and a flow path portion that is parallel to the longitudinal centerline; and a choke volume in the flow path, the choke volume being the smallest of the series of flow volumes between the inlet port and the outlet port and being disposed in the flow path portion that is parallel to the longitudinal centerline;

wherein the inlet port is in fluid communication with a first opening in the interior surface of the bore, the first opening being disposed between first and second seal edges, the first seal edge being fluidically upstream of the second seal edge;

wherein the outlet port is in fluid communication with a second opening in the interior surface of the bore, the second opening being disposed between the second seal edge and a third seal edge, the second seal edge being fluidically upstream of the third seal edge;

wherein the inlet port includes a first port window comprising a portion of the spherically shaped surface bounding the first internal groove that passes through the first opening in the interior surface of the bore and forms a spherically shaped transition from a portion of the inlet port to the bore;

wherein the outlet port includes a second port window comprising a portion of the spherically shaped surface bounding the second internal groove that passes through the second opening in the interior surface of the bore and forms a spherically shaped transition from a portion of the outlet port to the bore;

wherein the spool comprises a first seal configured to couple to the first seal edge, a second seal configured to couple to the second seal edge and a profiled portion disposed between the first and second seals, the profiled portion being configured to route fluid from the inlet port to the outlet port when the valve is in an open position;

wherein the profiled portion of the spool comprises a concave radially exterior surface;

wherein the first and second internal grooves have radially outermost surfaces; and wherein the spherically shaped surfaces of the body that radially bound the first and second internal grooves include the radially outermost surfaces.

\* \* \* \* \*